United States Patent
Kuehnle

Patent Number: 5,542,009
Date of Patent: Jul. 30, 1996

[54] INTEGRATED ACOUSTO-OPTICAL COMPONEN FOR FREQUENCY-SHIFTING OPTICAL FREQUENCIES

[75] Inventor: Goetz Kuehnle, Gerlingen, Germany

[73] Assignee: Robert Bosch GmbH, Stuttgart, Germany

[21] Appl. No.: 374,709

[22] PCT Filed: Aug. 24, 1993

[86] PCT No.: PCT/DE93/00769

§ 371 Date: Jan. 25, 1995

§ 102(e) Date: Jan. 26, 1995

[87] PCT Pub. No.: WO94/06053

PCT Pub. Date: Mar. 17, 1994

[30] Foreign Application Priority Data

Sep. 10, 1992 [DE] Germany .................. 42 30 300.1

[51] Int. Cl.⁶ ................................................ G02B 1/335
[52] U.S. Cl. .................................................... 385/7
[58] Field of Search ........................ 387/7–9, 14–23

[56] References Cited

U.S. PATENT DOCUMENTS 3,850,503  11/1974  Riseberg et al. .................. 385/16

FOREIGN PATENT DOCUMENTS 2555769  5/1985  France .
3013335  10/1981  Germany .

OTHER PUBLICATIONS

Oliver et al: "Polarization-independent operation of an acousto-optical device at the transmit end of a . . ." In: Optics Communications, vol. 81, No. 6, Mar. 1991, Amsterdam NL, pp. 359–363.

Primary Examiner—Akm E. Ullah
Attorney, Agent, or Firm—Spencer & Frank

[57] ABSTRACT

An integrated acoustooptical component for frequency-shifting optical frequencies is proposed, in which two separately guided optical waveguides exhibit an optical coupling region, which is designed in the manner of a directional coupler and in which the two optical waveguides exhibit a small spacing from one another generating an optical coupling. The acoustic waves of a sound generator propagate in the longitudinal direction over the coupling region. The two optical waveguides exhibit differing propagation constants for light. If, for example, light of mode a is injected into the optical waveguide and if the sound generator is energised, then the photons of mode a are scattered at the phonons of the acoustic waves and converted into mode b of the optical waveguide, where they can propagate. This gives rise to a frequency shifting. Accordingly, the acoustooptical component includes a frequency shifter and at the same time a coupler, which can be used for beam splitting and/or as an optical switch.

11 Claims, 1 Drawing Sheet

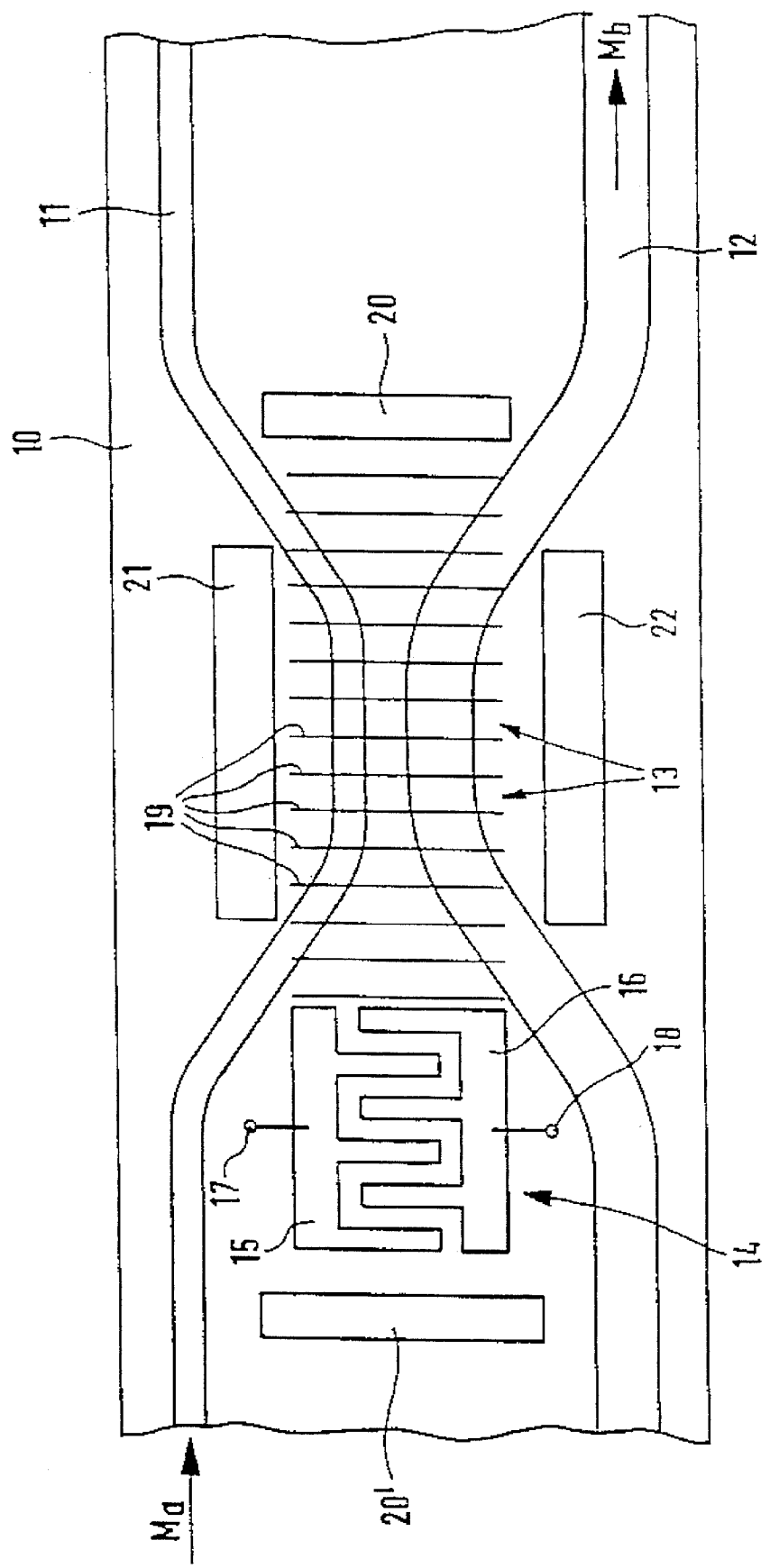

INTEGRATED ACOUSTO-OPTICAL COMPONEN FOR FREQUENCY-SHIFTING OPTICAL FREQUENCIES

BACKGROUND OF THE INVENTION

The invention relates to an integrated acoustooptical component for frequency-shifting optical frequencies having at least one optical waveguide, and a sound generator which subjects the optical waveguide with acoustic waves which propagate in a longitudinal direction relative to the waveguide.

Such acoustooptical components for frequency-shifting or frequency displacement are required, for example, in optical heterodyne interferometers. Such an acoustooptical component, designed as a modulator, is known for example from Appl. Phys. Lett. 17, 265 (1970), Kuhn, Daks, Heidrich and Scott. In this known modulator, in the first instance a light guide is split, and each one of the two split light beams must then be broadened and fed to an optical system, which generates in each instance a broad parallel light beam. These broad light beams then pass through zones of acoustic waves, which propagate perpendicular to the light. They act in the manner of an optical grating of the Bragg type, so that the light passing through is diffracted. The first-order diffracted beam is evaluated and contains a frequency shift. An optical system effects a feedback into light guides; in this case, the first-order frequency-shifted beam is further evaluated. The disadvantage of this known arrangement resides in the fact that the broadening of the light beam and feedback into a light guide is very costly from the technological point of view. Since the acoustic wave acts only within the range of the width of the light beam, a high electrical power for the acoustic wave must be applied. Furthermore, the separating-off of the frequency-shifted beam is problematic from the technological point of view, since the angle of diffraction is relatively small.

Furthermore, Journal of Lightware Technology, Vol. 6, No. 6, June 1988, pages 903 ff, Hinkov, Opitz and Sohler, discloses an acoustooptical mode converter in which no broadening of the light guided in waveguides is required. The sound wave is guided parallel to the light guide; in this case, a birefringent material is required. To provide the frequency displacement, the waveguide is branched in a Y branching; in this case, the two arms of the Y branching are designed as TE-TM mode converters, which are operated with acoustic surface waves. The acoustic centre frequency, at which the mode conversion takes place for a specified optical wavelength, is to a large extent determined by the crystal birefringence. With the aid of a proton-exchanged layer, the birefringence in one of the arms is shifted. The acoustooptical interaction in the two arms then takes place at differing acoustic centre frequencies, so that the optical frequencies of the two emergent beams are shifted by the difference frequency. The disadvantage of this known arrangement resides in the fact that an expensive, birefringent material is necessary, such as for example $LiNbO_3$. A further disadvantage is the relatively high temperature sensitivity of this process.

Moreover, Appl. Phys. Lett. 19 (1971) 428 ff, Kuhn, Heidrich and Lean, discloses an acoustooptical mode converter in which, again, no broadening of the light guided in waveguides is required. The sound wave is again guided parallel to the light guide in which at least two modes of the same polarisation must be capable of propagation. By scattering of the light at the acoustic wave, one mode is converted into another mode and in this case frequency-shifted. Disadvantages of this process reside in the very poor coupling of the modes, the poor separation of the light which is not frequency-shifted and that which is frequency-shifted and in the fact that the light guide must be at least bimode.

SUMMARY OF THE INVENTION

The acoustooptical component according to the invention has two separate optical waveguides each exhibiting different propagation constants ($\beta_a$, $\beta_b$) that together define an optical coupling region that forms a direction coupler. The two optical waveguides are spaced a small distance from one another in the optical coupling region so as to generate an optical coupling. A sound generator is provided which subjects the two optical waveguides in their coupling region with acoustic waves which propagate in a longitudinal direction relative to the waveguides. At least two limiters are provided, each being arranged on a respective side of the coupling region for preventing the lateral propagation of the acoustic waves. The limiters form an acoustic waveguide. Such an invention has the advantage, as compared with the demonstrated prior art, that on the one hand no birefringent electrooptical material can be used (such as for example oxinitride on silicon wafers or in polymers), in order to generate a frequency shift. As a result of this, relatively cheap materials can be used, which are less temperature-sensitive. A broadening of the light guided in light guides is not required, and a high efficiency is achieved with low power of the acoustic frequency generator. The problems in a splitting of diffracted beams do not occur. Over and above this, the frequency-shifting component according to the invention acts at the same time as an optical coupler, so that an additional or simultaneous use as optical switch is possible. Since the acoustooptical component according to the invention requires only two light guides, disposed in a specified manner, with differing propagation constants as well as an acoustic sound generator, it can be produced in a simple and economical manner.

For the optimal coupling-out, the difference of the propagation constants ($\vec{\beta_a}$, $\vec{\beta_b}$) of the two optical waveguides amounts to the propagation constant $\vec{K}$ of the acoustic wave ($\vec{\beta_b} = \vec{\beta_a} \pm \vec{K}$). By deenergisation of the sound generator or alteration of its frequency, switching functions can be generated, i.e. the coupling-over from one light guide to the other can be suppressed.

To generate the difference of the propagation constants of the optical waveguides, it is possible to provide differing dimensionings of the same and/or differing materials of the same and/or differing modes of the guidance of the optical waves. In this case, for example, differing widths and/or heights of the optical waveguides can be provided expediently for the differing dimensioning.

The sound generator is expediently provided to generate acoustic surface waves and designed as an interdigital electroacoustic transducer, which can be formed in a relatively simple manner, for example by vapour deposition or imprinting of the surface of the component.

The sound generator is disposed in extension of the coupling region between the two waveguides, so that a simple and easily realisable structure is present.

The sound generator and the coupling region which is disposed alongside the same are bounded in the longitudinal direction on at least one side by a sound absorber, in order to prevent an uncontrolled spread of sound in regions in which this is undesired.

Furthermore, advantageously limiters preventing the lateral propagation of the acoustic waves are disposed on both sides of the coupling region, which limiters form an acoustic waveguide, and thereby the electrical power of the sound generator can be reduced or the acoustic power in the coupling region can be increased.

BRIEF DESCRIPTION OF THE DRAWING

An illustrative embodiment is shown in the drawing and explained in greater detail in the description which follows. The single figure diagrammatically shows the acoustooptical component in plan view.

DETAILED DESCRIPTION OF THE INVENTION

Two optical waveguides 11, 12 with differing propagation constants $\vec{\beta}_a$ and $\vec{\beta}_b$ are disposed on a piezoelectric substrate 10. In the illustrative embodiment, the differing propagation constants are achieved by differing widths of the optical waveguides 11, 12, but it is also possible to employ other differing dimensionings, such as for example differing heights, differing materials and/or the use of differing modes of the light propagation. In a coupling region 13, the two optical waveguides 11, 12 are brought close to one another over a specified distance, such that the fields of the two modes a and b of the light in the two optical waveguides 11, 12 overlap sufficiently well. As a result of this, the coupling factor K of the thus formed directional coupler becomes unequal to zero. A sound generator 14, disposed in the longitudinal direction to the coupling region 13 between the two optical waveguides 11, 12, for acoustic waves, is designed as an interdigital electroacoustic transducer, as has been described in greater detail in the initially cited prior art. Such a sound generator 14 comprises two electrodes 15, 16 which are interindented; in this case, tongues of the two interindented electrodes 15, 16 are disposed parallel alongside one another. If an alternating voltage is applied to connections 17, 18 of these electrodes 15, 16, then as a result of electrostriction of the piezoelectric substrate or of an applied layer, an acoustic wave 19 propagating in the longitudinal direction with an appropriate frequency is generated. This acoustic wave extends over the coupling region 13 and is bounded in the longitudinal direction, at that end region of the coupling region 13 which is opposite to the sound generator 14, by a sound absorber 20. At the opposite side of the sound generator 14 there is disposed a further sound absorber 20'. As a result of the limiters 21, 22, an acoustic waveguide is formed in the coupling region 13. This leads to an acoustic wave (surface wave) of concentrated energy in the coupling region 13 and prevents a lateral propagation of the acoustic wave.

An insulating layer can further be disposed over the optical waveguides 11, 12 in a known manner. The sound generator 14, the sound absorbers 20, 20' and the acoustic waveguides (i.e., the limiters 21, 22) can also be disposed on this insulating layer, so that they can overlap one another, in plan view, with the optical waveguides. If this insulating layer is designed as a piezoelectric layer, the substrate 10 can also comprise a non-piezoelectric material.

In a typical illustrative dimensioning, the spacing between the two optical waveguides in the coupling region 13 can exhibit the value 10 μ and elsewhere ten times the value. The length of the coupling region is a few millimeters, and the width of the optical waveguides 11 and 12 is 3 or respectively 10 μ. Variations of these values are of course possible, not least as a function of the optical wavelengths employed; in this case, laser light, for example a laser diode, is in particular used.

The light in the optical waveguide 11 is guided in mode a ($M_a$) with the propagation constant $\vec{\beta}_a$ and the angular frequency $\omega_a$. In the optical waveguide 12, the light is guided in mode b with the different propagation constant $\vec{\beta}_b$ and the angular frequency $\omega_b$. The acoustic surface wave 19 has a propagation constant K and an angular frequency $\Omega$. Modes a and b and the acoustic wave 19 propagate in the interaction region, i.e. in the coupling region 13, collinearly. Since the propagation constants of modes a and b are different, with correct selection of the coupling length L, i.e. of the length of the coupling region 13 and of the coupling spacing, i.e. the spacing of the optical waveguides in the coupling region 13 and thus of the coupling factor K, without the acoustic wave the conversion from mode a to mode b, i.e. from the optical waveguide 11 to the optical waveguide 12 and vice versa, is almost zero.

If a light beam of mode a is injected, according to the figure, into the optical waveguide 11 and if the sound generator 14 is energised, then the photons of mode a are scattered at the phonons of the acoustic wave (Brillouin scattering). The scattered wave has the propagation constant $\vec{\beta}_a \pm \vec{K}$ (+: a phonon of the acoustic wave is absorbed, −: a phonon of the acoustic wave is liberated). If this propagation constant is identical with the propagation constant of mode b of the optical waveguide 12 (phase matching), then the following is applicable:

$$\vec{\beta}_b = \vec{\beta}_a \pm \vec{K}$$

The scattered wave is converted into mode b. The scattered wave is generated only in that part of mode a which overlaps with the optical waveguide 12, i.e. in the coupling region, for only there can this wave propagate. At the exit of the optical waveguide 11 there is therefore present the unscattered wave a, and at the exit of the optical waveguide 12 there is now present mode b, which has the same propagation constant and frequency as the scattered wave. The frequency is shifted by the scattering of the wave a at the acoustic wave. Accordingly, the frequency of the wave b is the following:

$$\omega_b = \omega_a \pm \Omega$$

The light of mode b in the optical waveguide 12 is therefore frequency-shifted. This emerges, in a consistent fashion, from the application of the laws of conservation of momentum and of energy in the case of scattering (collision) of photons and phonons. The efficiency of the conversion of mode a into frequency-shifted mode b is close to 100% with correct selection of the geometric dimensions (coupling length, coupling spacing).

In this case, the geometric dimensions may for example be selected so that for the coupling spacing and the consequent coupling factor K and the coupling length L the following is applicable:

$$K = \frac{(2m_1 + 1) \cdot |\vec{K}|}{2 \sqrt{(2 \cdot m_2)^2 - (2 \cdot m_1 + 1)^2}}$$

$$L = \frac{\pi}{|\vec{K}|} \cdot \sqrt{(2 \cdot m_2)^2 - (2 \cdot m_1 + 1)^2}$$

with $m_2 > m_1 \leq 0$, where $m_1$ and $m_2$ are integers.

The ratio of non-frequency-shifted light in the optical waveguide 12 to frequency-shifted light in the optical waveguide 12 is then approximately the following:

$$\frac{(2 \cdot m_1 + 1)}{2} \cdot \pi \cdot \frac{\delta K^2}{K} + \frac{(2 \cdot m_2)}{2 \cdot m_1 + 1} \cdot m_2 \cdot \pi \cdot \frac{\delta L^2}{L}$$

where $\delta K$ and $\delta L$ indicate the deviation of K and L respectively from the aforementioned ideal values. In the ideal case, accordingly only frequency-shifted light is coupled into the optical waveguide 12.

In contrast to the shown illustrative embodiment, light of mode b could also be injected into the optical waveguide 12. In these circumstances, there now arises in the coupling region a scattering to the optical waveguide 11 and a conversion into mode a. While in the case of the example shown (injection of light of mode a into the optical waveguide 11) a frequency increase by the value $\Omega$ can be observed, a frequency decrease by the value $\Omega$ can now be detected. If light is injected into the optical waveguides 11 or 12 in the opposite direction, then the conditions are reversed.

The arrangement shown can also be used as an optical switch with switching times of the order of magnitude of 10 μs, in that when the sound generator is energised a light transfer into the respective other optical waveguide takes place, while on the other hand in the deenergised condition of the sound generator 14 this does not take place. Moreover, by means of the component shown it is possible to implement—as described—not only a frequency shift, but at the same time also a beam splitting, as are required, for example, in a heterodyne interferometer.

In this case, the coupling spacing and thus the coupling factor K and the coupling length L must be selected in accordance with the beam splitting ratio. This can be achieved, for example, in that the term $(2 \cdot m_1 + 1)$ is replaced, in the above equations, by the term $(2 \cdot m_1 + 2 \cdot \arcsin(\sqrt{\alpha})/\pi)$. In this case, $\alpha$ is the ratio of the optical power at the exit of the optical waveguide 12 to the optical power at the entrance of the optical waveguide 11.

Moreover, the arrangement shown can also be used as a variable beam splitter, in that the acoustic frequency is varied and thus deviation takes place from the ideal equation $\vec{\beta}_b = \vec{\beta}_a \pm \vec{K}$ ($\vec{K}$ variable). Arbitrarily selectable beam splitting ratios can be set by this variation of the acoustic frequency.

I claim:

1. An integrated acousto-optical component for frequency-shifting optical frequencies, comprising:
   two separate optical waveguides each having different propagation constants ($\beta_a$, $\beta_b$) and together defining an optical coupling region that forms a direction coupler, said two optical waveguides being spaced a small distance from one another in said optical coupling region so as to generate an optical coupling;
   a sound generator which subjects said two optical waveguides in their coupling region with acoustic waves which propagate in a longitudinal direction relative to said optical waveguides; and
   at least two limiters, each said limiter being arranged on a respective side of said coupling region for preventing the lateral propagation of the acoustic waves, said limiters forming an acoustic waveguide.

2. A component according to claim 1, wherein the difference of the propagation constants of the optical waveguides corresponds to the propagation constant K of the acoustic wave such that $\vec{\beta}_b = \vec{\beta}_a \pm \vec{K}$.

3. A component according to claim 1, wherein the difference of the propagation constants of the optical waveguides is generated by at least one of providing differing dimensionings of said optical waveguides and providing differing materials of said optical waveguides and providing differing modes of the guidance of the optical waves.

4. A component according to claim 3, wherein the differing dimensioning comprises providing said optical waveguides with at least one of differing widths and heights.

5. A component according to claim 1, wherein said sound generator generates acoustic surface waves.

6. A component according to claim 5, wherein said sound generator is an interdigital electroacoustic transducer.

7. A component according to claim 1, wherein said sound generator is disposed in an extension of the coupling region between the two optical waveguides.

8. A component according to claim 1, wherein said sound generator and the coupling region are bounded in the longitudinal direction on at least one side by a sound absorber.

9. An optical switch comprising a component according to claim 1.

10. A combined frequency shifter and beam splitter comprising a component according to claim 1.

11. A variable beam splitter which operates by variation of the acoustic frequency, comprising a component according to claim 1.

* * * * *